United States Patent [19]

Risko

[11] 3,731,948
[45] May 8, 1973

[54] OCCUPANT RESTRAINT SYSTEM

[75] Inventor: Richard C. Risko, Sterling Heights, Mich.

[73] Assignee: General Motors Corporation, Detroit, Mich.

[22] Filed: Dec. 2, 1971

[21] Appl. No.: 204,159

[52] U.S. Cl. ............... 280/150 AB, 49/477, 137/68, 138/93, 215/80, 220/45, 222/3

[51] Int. Cl. ....................................... B60r 21/02

[58] Field of Search .................. 280/150 AB; 215/80; 222/3, 4, 5; 220/45; 49/477; 137/67, 68, 69, 70, 71; 138/89, 93

[56] References Cited

UNITED STATES PATENTS

| | | | |
|---|---|---|---|
| 2,736,459 | 2/1956 | Cockram et al. | 137/68 |
| 1,140,486 | 5/1915 | Scholz | 215/80 |
| 3,209,937 | 10/1965 | Hirst et al. | 137/69 X |
| 3,547,467 | 12/1970 | Pociask | 280/150 AB |

*Primary Examiner*—Benjamin Hersh
*Assistant Examiner*—John P. Silverstrim
*Attorney*—W. E. Finken et al.

[57] ABSTRACT

An occupant restraint system includes a pressure vessel providing a source of pressure fluid and having a cylindrical outlet neck including cylindrical inner and outer walls joined by a radial end wall provided with an axially outwardly opening continuous groove of generally rectangular cross section. A manifold communicates the pressure vessel with a diffuser and an inflatable occupant restraint cushion. The manifold includes a threaded inlet wall which is threaded on the threaded outer wall of the neck and which merges into the passage wall of the manifold across a radial wall. A cylindrical glass diaphragm has one face juxtaposed to the outlet opening of the neck and the groove in the end wall and an opposite face juxtaposed to the radial wall of the manifold. A seal of resilient material covers the one face of the diaphragm and the side wall thereof, and partially covers the other face. An integral rib extends axially of the one face and is received within the groove in the end wall of the pressure vessel. The seal is compressed between the radial wall of the manifold and the end wall of the pressure vessel and the seal rib is compressed against the base wall of the groove. The seal rib is of lesser cross section than the groove and the leakage of pressure fluid between the seal and the end wall into the groove forces the radial outer wall of the rib into engagement with the radial outer wall of the groove. Detonators encased in stemming material seat against the other face of the glass diaphragm and are electrically fired to rupture the diaphragm.

3 Claims, 1 Drawing Figure

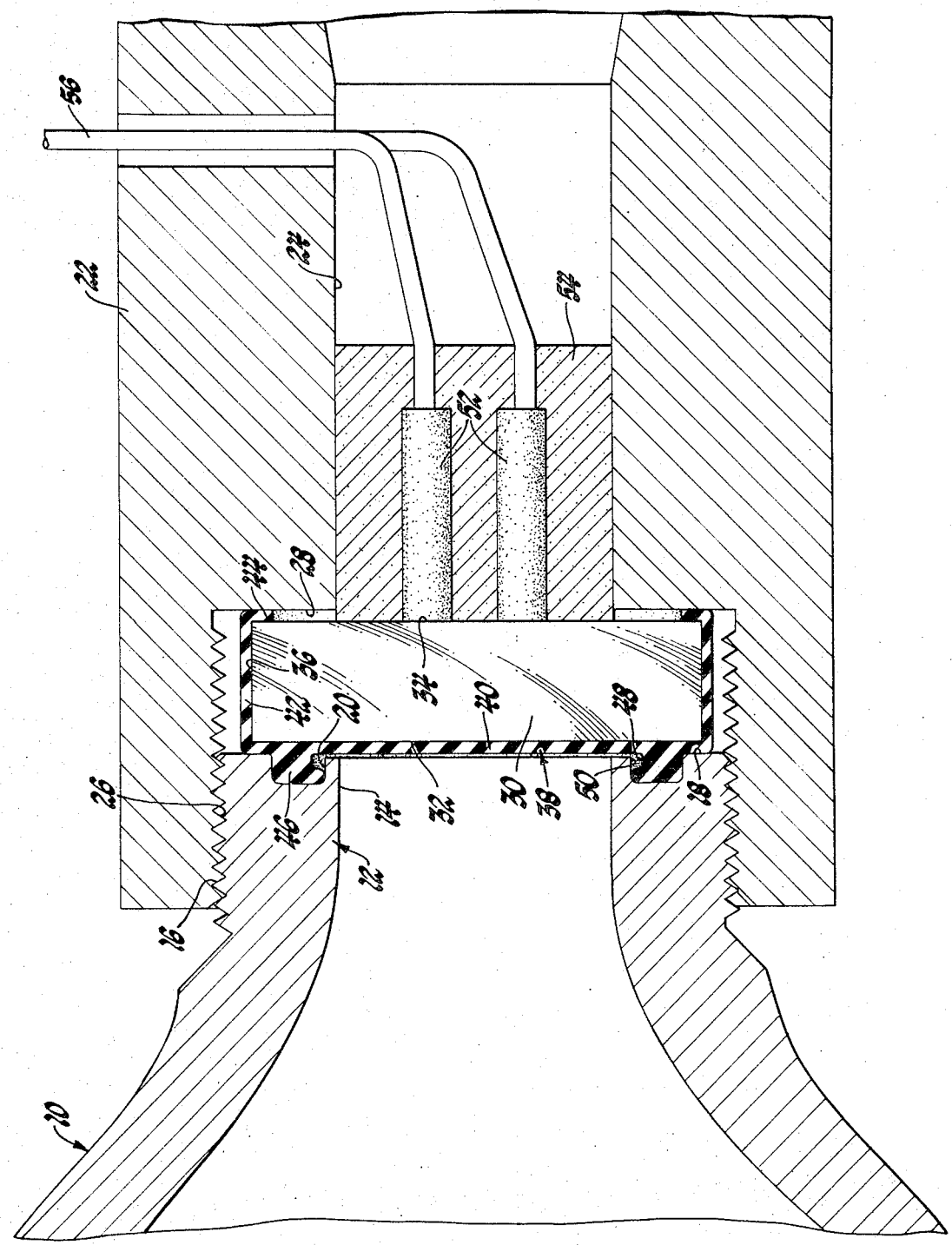

OCCUPANT RESTRAINT SYSTEM

This invention relates generally to occupant restraint systems and more particularly to a sealing arrangement for sealing the opening of a pressure vessel to block communication between the vessel and an inflatable occupant restraint cushion.

One feature of this invention is that the sealing arrangement includes a glass diaphragm which is explosively ruptured to perit passage of the contents of the pressure vessel to the cushion. Another feature of this invention is that the glass diaphragm is encased in a resilient seal which includes an integral annular continuous rib cooperating with a like groove in an end wall of the pressure vessel to seal the pressure vessel and diaphragm. A further feature of this invention is that the pressure vessel groove is of larger size than the rib of the seal and the leakage of pressure fluid past the seal into the space between the radial inner walls of the rib and groove forces the radial outer wall of the rib into engagement with the radial outer wall of the groove.

These and other features will be readily apparent from the following specification and drawing wherein:

FIG. 1 is an enlarged sectional view of a sealing arrangement according to this invention.

Referring now to the drawing, an occupant restraint system includes a conventional pressure vessel 10 containing air, nitrogen, or other fluid under pressure and having a cylindrical outlet neck 12. The neck 12 includes an inner wall 14, a threaded outer wall 16, and a radially extending and axially facing end wall 18. Wall 18 is provided with a continuous axially opening annular groove 20 of generally rectangular cross section.

A cylindrical manifold 22 is of conventional structure and communicates with a conventional diffuser which in turn communicates with an inflatable occupant restraint cushion for inflation of such cushion when the contents of the pressure vessel 10 are released to the manifold as will be further described. The manifold 22 includes a passage 24 of cylindrical cross section which is joined to a threaded inlet wall 26 of larger diameter by a radially extending wall or shoulder 28.

A cylindrical diaphragm 30 of tempered glass includes generally parallel spaced faces 32 and 34 respectively juxtaposed to walls 18 and 28 and a peripheral or side wall 36 juxtaposed to wall 26. A seal 38 of resilient material includes a first seal face or portion 40 which covers the face 32, a second integral seal wall or portion 42 which covers the wall 36, and a third integral seal lip or portion 44 which partially covers the face 34. The seal 38 thus generally encases the diaphragm 30 except for a portion of the face 34. The portion 40 of the seal includes an integral axially extending continuous annular rib 46 of generally rectangular cross section which is received within the groove 20.

The portions 40 and 44 of the seal are respectively compressed between the faces 32 and 34 of the glass diaphragm and the respective juxtaposed walls 18 and 28 of the pressure vessel and manifold when the manifold 22 is threaded onto the outer wall 16 of the neck 12. This also axially compresses the rib 46 since its axial extent is greater than the axial depth of the groove 20. However, the radial extent of the rib 46 is less than that of the groove and an annular space is therefore left between the radial inner wall 48 of the rib and the radial inner wall 50 of the groove. The leakage of pressure fluid between the seal portion 40 and the end wall 18 into this annular space forces the radial outer wall of the rib into tight sealing engagement with the radial outer wall of the groove. Thus, the interior of the pressure vessel 10 is sealed against communication with the passage 24 to prevent any flow of pressure fluid from the pressure vessel to the occupant restraint cushion until such time as the diaphragm 30 is ruptured.

A pair of conventional electrically fired detonators 52 are located within the passage 24 in engagement with the face 34 of the diaphragm by conventional friable stemming material 54. The leads 56 of the detonators are connected across the source of power and a known sensor which may be of the type actuated by an acceleration pulse of predetermined amplitude and time or of the type actuated by a change in velocity of the vehicle resulting from impact of the vehicle with an obstacle. When the detonators 48 are fired, they rupture the glass diaphragm 30 to open the passage 24 to the pressure vessel 10. The stemming material 54 and the glass diaphragm 30 are reduced to particles or powder and the seal 38 is ruptured into a number of pieces when the contents of the pressure vessel flow to the cushion. These are usually trapped at one or more places in the manifold or diffuser.

Thus, this invention provides an improved occupant restraint system.

I claim:

1. An occupant restraint system comprising, in combination, a pressure vessel containing fluid under pressure for inflation of an occupant restraint cushion and including a generally annular outlet having an annular inner wall defining the outlet opening and joined to a generally annular outer wall by a radially extending end wall having an axially outwardly opening continuous groove provided therein, an annular glass diaphragm overlying the outlet opening and the end wall, a seal of resilient material covering at least the annular area of the glass diaphragm juxtaposed to the end wall of the pressure vessel and including an integral continuous sealing rib extending axially into the groove of the end wall of the pressure vessel and being of smaller radial cross section than such groove, the sealing rib including a radial outer wall forced into engagement with the radial outer wall of the groove by the flow of pressure fluid between the seal and the pressure vessel end wall and into the space between the radial inner wall of the groove and that of the rib, and means engageable with the glass diaphragm and the pressure vessel to bias the glass diaphragm toward the end wall and compress the seal between such end wall and the glass diaphragm.

2. An occupant restraint system comprising, in combination, a pressure vessel containing fluid under pressure for inflation of an occupant restraint cushion and including a generally annular outlet having an annular inner wall defining the outlet opening and joined to a generally annular outer wall by a radially extending end wall having an axially outwardly opening continuous groove provided therein, an annular glass diaphragm having one face overlying the outlet opening and the end wall, an annular seal of resilient material having one portion thereof covering the annular area of the glass diaphragm juxtaposed to the end wall of the pressure vessel and including an integral continuous sealing rib extending axially into the groove of the end wall of the pressure vessel and being of larger axial extent and lesser radial extent than such groove, the sealing rib including a radial outer wall forced into engagement with the radial outer wall of the groove by the flow of pressure fluid between the seal and the pressure vessel end wall and into the space between the radial inner wall of the groove and that of the rib, passage means communicating with the annular outlet and including a radial wall juxtaposed to an annular area of the other face of the glass diaphragm, the seal including a second portion covering at least the annular area of the other face of the glass diaphragm, and means compressing the seal portions between the respective faces of the glass diaphragm and the radial walls.

3. An occupant restraint system comprising, in combination, a pressure vessel containing fluid under pressure for inflation of an occupant restraint cushion and including a generally cylindrical outlet having a cylindrical inner wall defining the outlet opening and joined to a generally cylindrical outer wall by a radially extending end wall having an axially outwardly opening continuous groove provided therein, cylindrical glass diaphragm having one face overlying the outlet opening and the end wall, a seal of resilient material having one portion covering at least the annular area of the one face of the glass diaphragm juxtaposed to the end wall of the pressure vessel and including an integral sealing rib extending axially into the groove of the end wall of the pressure vessel and being of larger axial extent and lesser radial extend than such groove, the seal including a second portion covering the peripheral wall of the glass diaphragm and a third portion covering an annular area of the opposite face of the glass diaphragm, a manifold having a passage generally aligned with the outlet and including a radial wall generally juxtaposed to the end wall of the pressure vessel, and means securing the manifold to the outlet of the pressure vessel to locate the radial wall thereof in engagement with the third portion of the seal to compress such third portion between such radial wall and the opposite face of the glass diaphragm and compress the first portion of the seal between the one face of the glass diaphragm and the end wall of the outlet, the sealing rib including a radial outer wall forced into engagement with the radial outer wall of the groove by the leakage of pressure fluid between the one portion of the seal and the pressure vessel end wall and into the space between the radial inner wall of the groove and that of the rib, and means located within the manifold passage and selectively engageable with the opposite face of the glass diaphragm in the uncovered area thereof to rupture the glass diaphragm and permit communication between the pressure vessel and the manifold.

* * * * *